(12) United States Patent
Kurtin et al.

(10) Patent No.: US 8,976,456 B2
(45) Date of Patent: Mar. 10, 2015

(54) DETACHABLE LENS FOR VARIABLE FOCUS SPECTACLES

(76) Inventors: Stephen Kurtin, Sherman Oaks, CA (US); Steven Hecker, Mar Vista, CA (US)

( * ) Notice: Subject to any disclaimer, the term of this patent is extended or adjusted under 35 U.S.C. 154(b) by 336 days.

(21) Appl. No.: 13/066,034

(22) Filed: Apr. 5, 2011

(65) Prior Publication Data

US 2011/0181831 A1 Jul. 28, 2011

Related U.S. Application Data

(60) Continuation of application No. 12/802,992, filed on Jun. 17, 2010, now abandoned, which is a division of application No. 11/903,334, filed on Sep. 21, 2007, now Pat. No. 7,866,816.

(60) Provisional application No. 60/850,742, filed on Oct. 10, 2006.

(51) Int. Cl.
| | |
|---|---|
| *G02B 1/06* | (2006.01) |
| *G02B 3/12* | (2006.01) |
| *G02B 3/14* | (2006.01) |
| *G02C 7/08* | (2006.01) |

(52) U.S. Cl.
CPC G02B 3/14 (2013.01); G02C 7/085 (2013.01); G02C 7/086 (2013.01)
USPC .......................................................... 359/665

(58) Field of Classification Search
CPC .......... G02C 11/00; G02C 5/22; G02C 7/102; G02C 11/02; G02C 11/10; G02C 13/00; G02C 13/001; G02C 13/003; G02C 1/04; G02C 1/06; G02C 1/10; G02C 2200/02; G02C 2200/08; G02C 2202/20; G02C 5/14

USPC .............. 351/44–47, 51, 57, 159.01, 159.41, 351/159.48, 159.7, 159.73; 359/672, 676, 359/694, 699–701, 703, 704, 665, 159

See application file for complete search history.

(56) References Cited

U.S. PATENT DOCUMENTS

| | | | | |
|---|---|---|---|---|
| 1,415,511 | A * | 5/1922 | Bausch | 359/812 |
| 3,436,151 | A * | 4/1969 | Conrose, Sr. | 356/72 |
| 5,668,620 | A * | 9/1997 | Kurtin et al. | 351/158 |
| 6,853,507 | B2 * | 2/2005 | Ryu et al. | 359/824 |
| 6,893,124 | B1 * | 5/2005 | Kurtin | 351/57 |
| 6,910,768 | B2 * | 6/2005 | Zelman | 351/50 |
| 7,004,580 | B2 * | 2/2006 | Jackson et al. | 351/86 |
| 7,320,514 | B2 * | 1/2008 | Smith | 351/47 |
| 2003/0112408 | A1 * | 6/2003 | Zelman | 351/47 |
| 2004/0021823 | A1 * | 2/2004 | Wang | 351/47 |
| 2004/0027534 | A1 * | 2/2004 | Ifergan | 351/47 |

(Continued)

FOREIGN PATENT DOCUMENTS

| | | | |
|---|---|---|---|
| FR | 002051627 | * | 4/1971 |
| FR | 002051627 A1 | * | 4/1971 |
| JP | 2008076917 A | * | 4/2008 |

*Primary Examiner* — Thomas K Pham
*Assistant Examiner* — Sharrief Broome
(74) *Attorney, Agent, or Firm* — Saul Epstein (57) ABSTRACT

A detachable lens for variable focus spectacles, the lens including a plurality of magnets in a groove on its rear surface for holding the lens to the spectacles. An interlocking boss keeps the lens from sliding off the spectacles, and a locating tab provides a means for assuring that the lens is installed on the correct side of the spectacles and with the proper orientation.

20 Claims, 4 Drawing Sheets

(56) References Cited

U.S. PATENT DOCUMENTS

| | | |
|---|---|---|
| 2005/0105041 A1 * | 5/2005 | Lerner et al. .................. 351/57 |
| 2005/0225713 A1 * | 10/2005 | Lerner et al. .................. 351/57 |
| 2005/0253997 A1 * | 11/2005 | Zelman .......................... 351/41 |
| 2006/0119788 A1 * | 6/2006 | Zelman .......................... 351/47 |
| 2006/0126007 A1 * | 6/2006 | Smith ............................ 351/47 |

\* cited by examiner

DETACHABLE LENS FOR VARIABLE FOCUS SPECTACLES

RELATED APPLICATIONS

This application is a continuation of application Ser. No. 12/802,992 filed on Jun. 17, 2010, now abandoned, which in turn was a division of application Ser. No. 11/903,334 filed on Sep. 21, 2007, now U.S. Pat. No. 7,866,816, issued on Jan. 11, 2011. The entire contents of application Ser. No. 12/802,992 and U.S. Pat. No. 7,866,816 are expressly incorporated herein by reference. This application also claims the benefit under 35 USC §119(e) of the filing date of U.S. Provisional Patent Application No. 60/850,742 entitled "Variable Focus Spectacles", filed Oct. 10, 2000.

BACKGROUND OF THE INVENTION

The invention described herein is a fixed lens for use with a new type of variable focus spectacles for presbyopes.

As people age, they gradually lose the ability to focus their eyes at various distances. After about the age of 40, the loss of "accommodation" (as the adjustable focusing ability of humans is called) generally becomes so severe that for almost all people it is not possible to focus both on distant objects and on objects at reading distance, even after distance vision has been corrected. Special types of spectacles have been developed to address this problem: bifocals, trifocals and "PALs" (Progressive Addition Lens). But these types of spectacles have serious deficiencies. They require the user to look through different regions of the lens when trying to focus on objects at different distances from the user. For example, a PAL user must look through the upper portion of the lens when looking at a distant object, and through a very small region in the lower center of the lens when reading a book. Similarly, bifocal users also must look through a small region in the lower portion of the lens to read. Such restrictions are unsatisfactory in many circumstances.

SUMMARY OF THE INVENTION

Spectacles including the presently preferred embodiment of the invention may be comprised of i) a "focus module" that includes two variable lens sections, each of which is constructed to provide a user adjustable optical power, and ii) a pair of preferably detachable prescription lenses placed in front of the variable lens sections, each of which provides an additional fixed optical power.

The prescription lenses described herein are the subject of the present invention and are shown placed in front of the variable lenses of the focus module. As disclosed herein, they may alternatively be placed behind the variable lenses. They are detachable and may be retained by magnets. Alternatively, they may be retained by other means, such as spring clips or other means. They are called "prescription" lenses because they preferably include most or all of the optical correction needed by the intended user to view distant objects clearly (the user's "distance prescription"). The correction needed may involve spherical, cylindrical, and/or possibly prismatic components.

One advantage of the present invention is that the prescription lenses may be fabricated from standard off-the-shelf finished ophthalmic lens blanks. They may also, of course, be fabricated from semi-finished blanks, or from other starting materials.

The optical powers of the variable lens sections may be adjusted by the user (preferably both simultaneously) through use of an actuator which is preferably contained within the bridge of the spectacles. The adjustable lens sections provide a variable spherical "ADD" to enable the user to focus on objects at various distances, for example at any distance between infinity and reading distance. The combination of one of the variable lens sections with a prescription lens in front is sometimes referred to herein as a "lens unit". The prescription lenses are sometimes called the "front" lenses, even though in some embodiments, as will be mentioned below, these lenses are not the items furthest away from the user's eyes.

As will be further discussed below, each lens unit is comprised of three lenses (a front lens, a variable liquid lens, and a rear lens). In the presently preferred embodiment of the invention, the front lens incorporates the intended user's distance prescription, including the spherical, cylindrical and prismatic components thereof, but if desired, portions (or possibly all) of the prescription could alternatively be incorporated in the rear lens. Also, the spherical component of the user's prescription, or a portion thereof, could be embodied in the variable liquid lens, if desired.

The focus module, which includes the rear lenses and the variable liquid lenses, contributes a predetermined range of variable spherical optical power to the total, for example zero to +3 diopters. If the front lenses incorporate all of the intended user's distance prescription, then when the focus module is adjusted to provide zero diopters of optical power, the intended user's eyes will be focused on distant objects. If the focus module is adjusted to +3 diopters, the intended user will focus on an object ⅓ meters (about 13 inches) away from his or her eyes.

It will be appreciated that the focus module could alternatively be constructed to provide ranges of optical power other than zero to +3 diopters, for example +1 to +3.5 diopters. In that case, the front lenses would preferably be fabricated to provide optical power which is less than the intended user's distance prescription by 1 diopter (spherical). Under these conditions, when the focus module is set to provide +1 diopter of optical power, the net optical power of the system will be such that the intended user will be able to view distant objects clearly, and when the focus module is set to provide +3.5 diopters, the spectacles as a whole will be providing +2.5 diopters of optical power more than the intended user's distance prescription, and hence he or she will be able to see clearly an object 1/2.5 meters (about 16 inches) away from his or her eyes.

In the description of the invention contained herein it is assumed, for simplicity, that the user's two eyes are identical, hence only one optical power need be discussed to describe the invention. Persons skilled in the art will appreciate, however, that the optical requirements for the two eyes for many users will not be the same, and consequently, the two lens units in spectacles for those persons will not have the same optical characteristics.

The terms "front" and "rear", as used in this document refer to the directions away from and toward a wearer of the spectacles. Hence, the "rear" lens is the lens closest to the user's eyes. Similarly, other directions are referenced to the user and his/her line of sight. That is, "lateral" refers to a direction substantially across the user's line of sight, and angles mentioned are angles around the user's line of sight. The various parts of the focus module are preferably fastened together by laser welding. Where explicitly shown, typical welds are indicated by solid black triangular areas in the drawings. The term "tab", as used herein, refers to a small projection from the circumference of one of the detachable lenses of the spectacles described herein.

Obviously, a complete pair of spectacles normally includes some means for holding the spectacles in position on the intended user's face. Such means could, for example, consist of temples attached to the focus module, or to the front lenses. The spectacles also preferably include nosepads. For clarity, these elements are not shown in the drawings. However, since appropriate temples and nosepads, as well as methods of incorporating them on spectacles, are well known in the art, those persons familiar with the art will have no difficulty in including such items in completed spectacles.

The description and drawings herein refer to the focus module as having a "rear" lens, with a liquid lens in front thereof (between the rear lens and the front lens). It will be appreciated that the same goals can be achieved, according to the principles of the present invention, in an alternate construction wherein the focus module is reversed. That is, where the liquid lens is the rearmost element (the film facing the user's eyes), and where the "rear" lens is located between the liquid lens and the front lens. Such construction is intended to be covered hereby as well as the preferred construction that is described in detail. Another alternate construction that is intended to be covered hereby uses lens units and focus modules constructed as described above, except that they are constructed to be worn by a user with the "front" lens facing the user's face, and the "rear" lens facing outward, the liquid lens being in between.

A more complete understanding of the invention may be obtained by reference to the Description of the Invention below, together with the appended drawings.

DETAILED DESCRIPTION OF THE INVENTION

Figure 1:
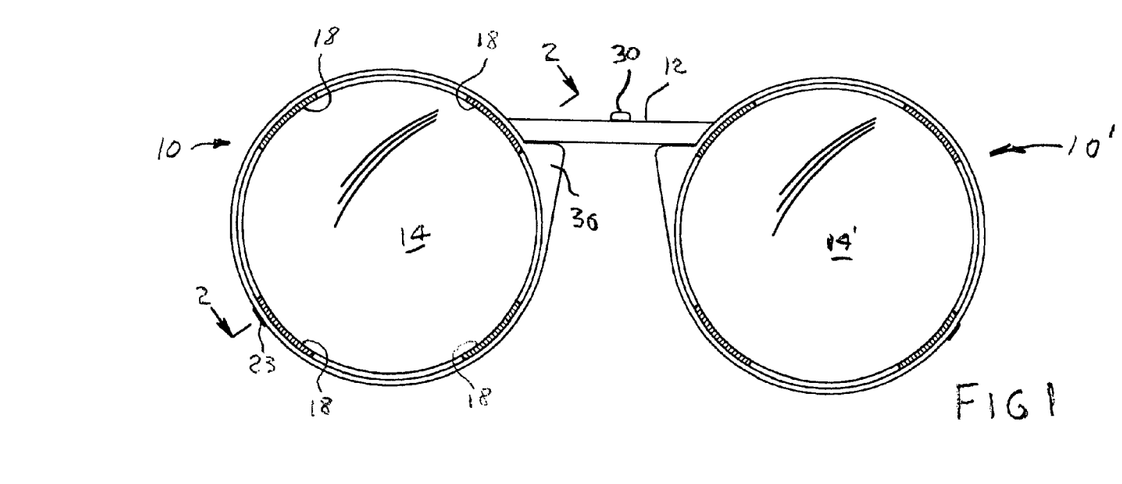
FIG. 1 is a front view of spectacles including the invention, looking inward toward a where a wearer would be.

FIG. 1 depicts a front view of one embodiment of spectacles with lenses according to the invention attached. Two lens units, 10 and 10', are shown, held in relative position by a bridge 12. Within bridge 12, but not shown in detail, is an actuator for adjusting the optical powers of the lens units. The actuator may, for example, be of the type described in U.S. Pat. No. 7,008,054, to which reference may be made for more details. Accordingly, the disclosures of U.S. Pat. No. 7,008,054 are incorporated herein by reference.

Inasmuch as the two lens units are mirror images of each other, only one will be discussed.

The actuator may be coupled to the rear ring 20 of lens unit 10 through link 13. The link 13 (and its mirror mate on the left lens unit 10' (not shown)) correspond to the links 35 and 36 in the above referenced patent. The link 13 may be attached to the rear ring directly, or may be attached via a projection 11. As described in detail in U.S. Pat. No. 7,008,054, adjustment of slider 30 (24 in the referenced patent) will cause the links 13 to move, which, in turn causes the rear ring 20 to move in an arcuate manner, as will be discussed below Each lens unit includes three physically distinct lenses: a fixed power front lens 14, a fixed power rear lens 15, and a variable power liquid lens 16. The combination of the three lenses results in a lens unit that is optically equivalent to a single lens such as is commonly used in an ordinary pair of single vision spectacles, except that the lenses in these spectacles have adjustable optical powers. In the preferred embodiment of the invention, the front lens is a "prescription" lens in the sense that it is preferably made to include all or almost all of the intended user's distance prescription. This is not a required condition, however; the user's prescription can be realized in the front lens, in the rear lens, or distributed among all three lenses of a lens unit, as may be convenient. For example, the front lens could have no optical power, and the intended user's distance prescription could be entirely in the rear and liquid lenses, or possibly entirely in the rear lens. In some other case, the rear lens might have zero optical power, and in such case the intended user's distance prescription would be entirely in the front and liquid lenses.

Figure 2:
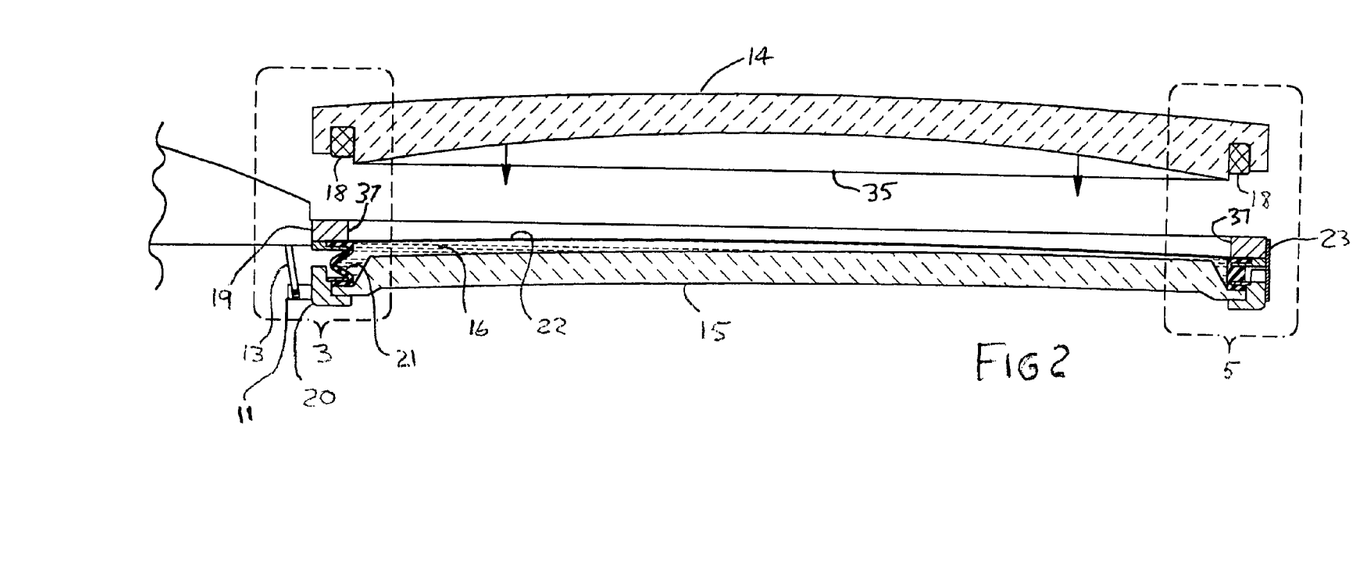
FIG. 2 is a partially exploded cross sectional view of one of the lens units of the spectacles of FIG. 1 taken at 2-2 of FIG. 1 with the lens unit set for distance viewing.

FIG. 2 shows a cross sectional view of the right lens unit 10 where, for illustrative purposes, the front lens 14 is shown separated from the focus module. A plurality of magnets are attached to the front lens 14, preferably in a groove 24 near the lens periphery (using an adhesive or other means). Four magnets are illustrated, but the number used in practice will depend on the strength of the magnets and the amount of holding force desired. As illustrated in FIG. 1, the magnets are visible from the front of the lens unit. However, as will be discussed below, in the presently preferred embodiment of the invention, the groove 24 is preferably filled with an opaque plastic compound, and the magnets will therefore be hidden; what is seen by an onlooker would be a circular stripe at the groove location.

The preferred magnet material is of the rare earth type, such as samarium cobalt or neodymium iron boron because their magnetic properties permit relatively high holding forces. Other magnetic materials are, of course, also possible. The magnets are attracted to the front ring 19 of the focus module (which ring is preferably fabricated from ferromagnetic material, as for example, 17-4PH steel). The magnetic attraction thereby holds the front lens to the focus module. This arrangement permits the front lenses to be removed for cleaning, for replacement by sun lenses, or for other reasons. The front ring 19 is sometimes called a rim herein inasmuch as the somewhat similar part in ordinary spectacles is called a rim.

Figure 7:
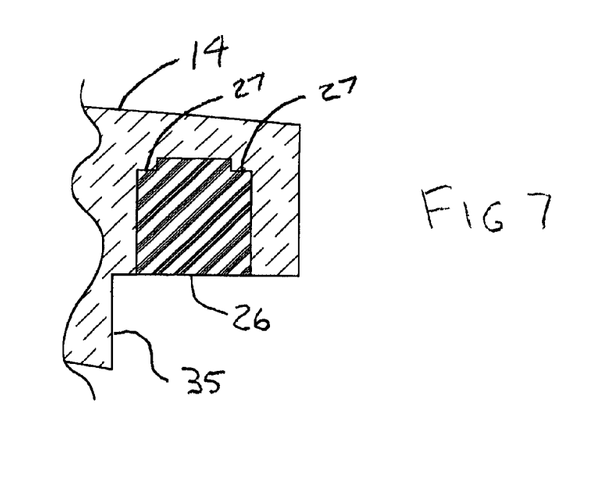
FIG. 7 is an enlarged fragmentary section of a portion of a representative front lens, showing the detail of a presently preferred groove into which the retaining magnets are inserted, the section being taken in a region where no magnets are located.
Figure 8:
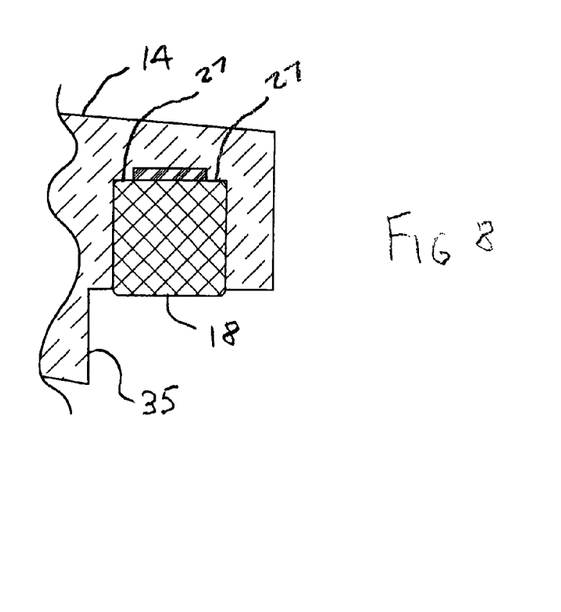
FIG. 8 is an enlarged fragmentary section of a portion of a representative front lens, showing the detail of a presently preferred groove into which the retaining magnets are inserted, the section being taken in a region where a magnet is located.

FIG. 7 shows a fragmentary sectional view of a front lens 14, enlarged to show the detail of a presently preferred shape of the bottom of the magnet retaining groove 24. Since the lens 14 is transparent, the groove 24, and anything contained in it, such as the magnets, will be visible to onlookers. In order to be cosmetically pleasing, it may be desirable that the magnets be hidden. This can be accomplished by filling the groove with an opaque filler material or potting compound, such as, for example, an epoxy filling 26 containing a colorant, and holding the magnets away from the bottom of the groove while the filler is curing. In the preferred embodiment of the invention, the magnets are held away from the bottom of groove 24 by two shoulders 27. For clarity, the shoulders in FIGS. 7 and 8 are exaggerated (and not shown in FIGS. 2-5). Only a very small clearance is needed between the magnets and the bottom of the groove to allow the epoxy to hide the magnets from onlookers, perhaps 0.002" will be adequate. The actual clearance needed will depend on the opacity of the epoxy. Also, the magnets are preferably a loose fit in the groove, and the filler material will flow around the sides of the magnets, helping to hold the magnets in the groove. The filler material on the sides of the magnets is not shown in the drawings. As mentioned above, for illustrative purposes, the magnets can be seen in FIGS. 1 and 9, even though in the presently preferred embodiment of the invention only a circular colored stripe will actually be visible to an onlooker.

Rear lens 15 is held by rear ring 20, and the combination is coupled to the front ring 19 through an elastomeric bellows 21, which allows the rear ring to move with respect to the front ring. A thin membrane of transparent distensible plastic film 22, such as saran, is attached to the rear of the front ring, between it and the bellows. For purposes of convenience, the front ring may be referred to as a membrane support member or structure. The space between the film and the rear lens is filled with a clear liquid 16, such as Dow-Corning DC-705 silicone fluid [which liquid (and the film) forms the liquid lens referred to above]. The clear liquid 16 is retained between the rear lens 15 and the film 22 by the elastomeric bellows 21.

A leaf hinge 23 couples the front and rear rings together at a point approximately opposite link 13. For explanatory clarity, the leaf hinge 23 is shown scabbed onto the circumference of the rings, but in practice, appearance and style may possibly dictate that the hinge be inset or otherwise partially or wholly hidden.

Figure 3:
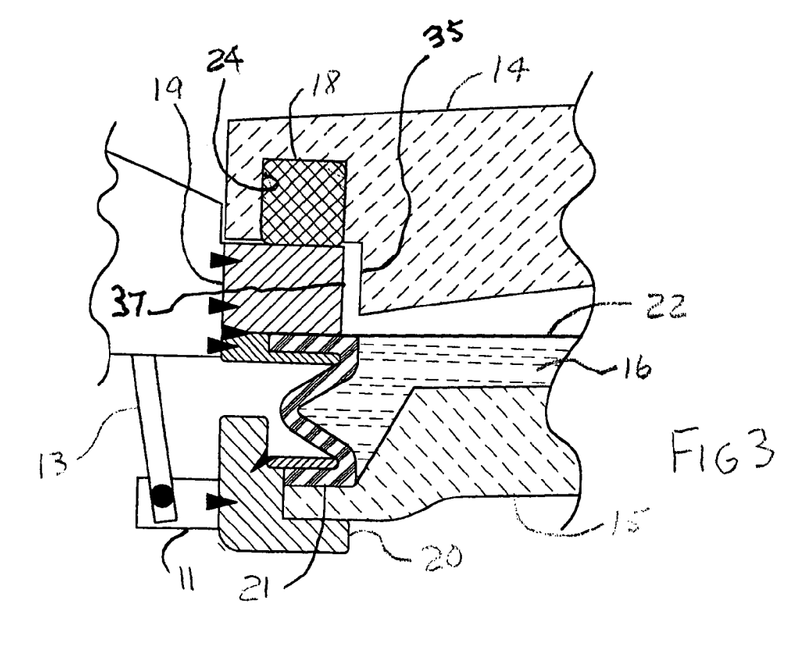
FIG. 3 is a fragmentary detail of FIG. 2, the location of the fragment is as denoted by the numeral "3" in FIG. 2, the lens unit being adjusted for distance viewing.
Figure 4:
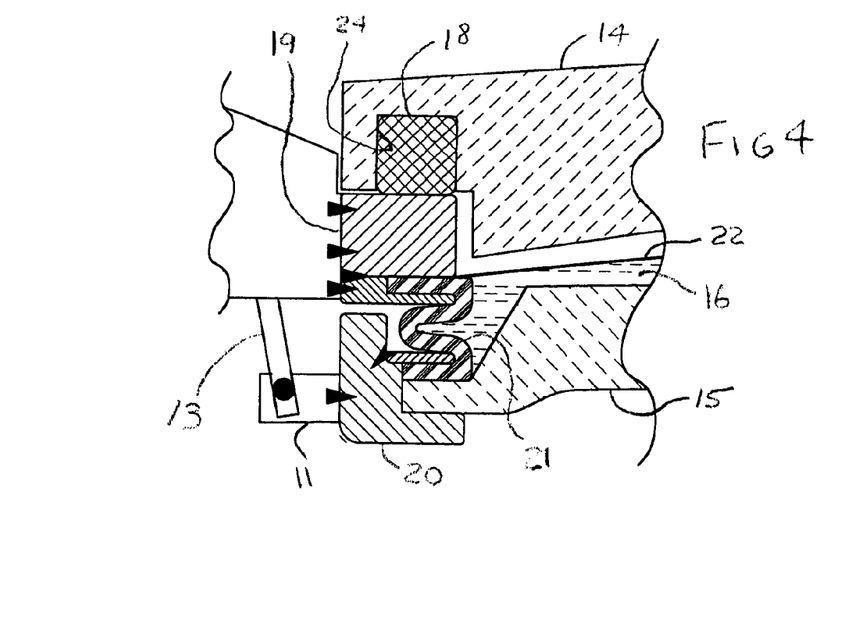
FIG. 4 is a fragmentary detail similar to FIG. 3, except that the lens unit is set for close viewing, e.g., reading.

FIGS. 3 and 4 are fragmentary sectional views of the right lens unit 10 taken near the location of the bridge 12. FIG. 3 shows the lens unit adjusted for distance viewing, and FIG. 4 shows the lens unit adjusted for near viewing. The difference is that in FIG. 3, the link 13 is extended so that rear ring 20 is further from front ring 19, as compared with FIG. 4 where the link 13 is retracted and rear ring 20 is closer to front ring 19, both distances being measured near the bridge. As link 13 moves (in response to the user moving slider 30), the rings experience relative rotation (i.e., a clamshell type of motion) about a line near leaf hinge 23.

For purposes of explanation, the rear lens, the filling liquid, and the film are assumed to have approximately the same index of refraction, although this is not an essential requirement. The preferred liquid, Dow-Corning DC-705, one of the preferred lens materials, polycarbonate, and the preferred film, saran, all have indices of refraction about 1.58, and thus satisfy this preference. It is preferred that the front surface of the film 22 have a small positive optical power when the focus module is set for distance viewing, for example, +1 diopter. The reason for this last preference is that the actuating mechanism described in U.S. Pat. No. 7,008,054 is capable of exerting force in only one direction, and if an actuator of that type is used, an external restoring force is required to return the system to its distance position. Positive film curvature (which implies tension in the film) can be used to supply at least a part of the needed restoring force. The bellows 21 and/or leaf hinge 23 can each also provide part of the needed force If the rearmost (i.e., exterior) surface of the rear lens has a negative curvature amounting to an optical power of −1 diopter, the focus module as a whole, when in the position illustrated in FIG. 3, will have a net optical power of zero (the +1 diopter optical power of the film surface balancing out the −1 diopter optical power of the rear surface). Note that if the rear lens and the filling liquid have the same index of refraction, the interface between them has no optical effect, and the optical power of the combination is equal to the sum of the powers of the two exterior surfaces. If the refractive indexes are not the same, the optical power at the interface may need to be taken into consideration.

When the link 13 is retracted toward the position shown in FIG. 4, the liquid will cause the film to bulge forward, increasing the optical power at its bulged surface, and thereby increasing the net optical power of the focus module. If the free area of the film is circular, as is preferred, the additional optical power will be spherical.

If, as set out in the example described above, the focus module has a net zero optical power when adjusted to the distance position, the front lens would preferably be made to contain the intended user's actual distance refractive demand, including both its spherical and cylindrical components (and possibly prism). If the focus module were constructed to have a distance optical power other than zero, say, for example, +2 diopters of spherical power, then the front lens would preferably be fabricated with the intended user's prescription, less 2 diopters of sphere.

The term "detachable", referring to the front lens, is intended to mean that the front lens is removable from the focus module by the wearer without the use of tools. Front lens removal may be desired for a number of reasons, including cleaning, or for replacement with tinted lenses to achieve sun protection. The front lenses of a pair of spectacles may be separate items, as shown, or they may be fastened together by a bridge of their own. They may be attached to the focus module by magnets, as illustrated, or by spring clips or other means. Even bayonet type connections may be used, if desired.

Figure 5:
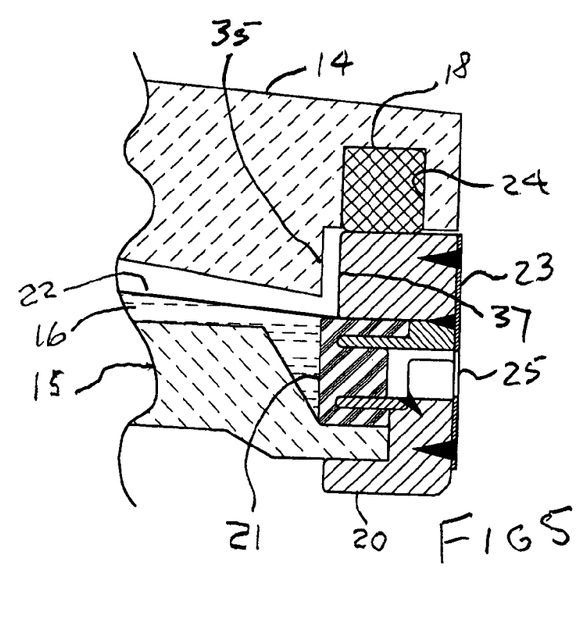
FIG. 5 is a fragmentary detail of FIG. 2, the location of the fragment is as denoted by the numeral "5" in FIG. 2.
Figure 6:
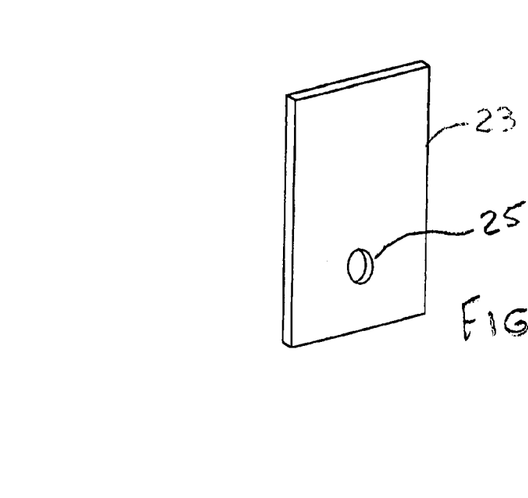
FIG. 6 is an oblique view of the leaf hinge used in connection with the illustrated embodiment of the invention.

Referring now to FIG. 5, it will be noted that the section of the bellows 21 shown does not have the shape of a bellows, as it does in, e.g., FIG. 3. At or near the leaf hinge 23, instead of having a bellows shape, the bellows 21 is preferably in the form of a solid piece of rubber. The reason for this is to make it easier to fill the lens unit with liquid. Since there is little or no relative motion between the rings near the leaf hinge, no bellows action is needed, and making the section solid is convenient.

To fill a lens unit, the needle of a hypodermic syringe filled with filling liquid is inserted through the hole 25 in leaf hinge 23, and also through the rubber at that section. Liquid can then be pumped into the lens unit interior, and air correspondingly removed, until the lens unit is completely full. It is preferred that a pencil point, or otherwise non-coring needle, be used so that when the needle is removed, the hole will seal.

When in use, as described above, membrane 22 moves with respect to the front lens 14 as the focus of the spectacles is adjusted. This motion would cause the air pressure between the liquid lens and the front lens to vary if the space between them were sealed. It will be recognized that an increase in air pressure (as would occur when ring 20 is moved closer to the membrane) might dislodge the front lens from the focus unit, or possibly cause other undesirable effects. Accordingly, it is desirable that a purposeful air leak exist between the front lens and the focus module. In the presently preferred embodiment of the invention, this leak is achieved by having the magnets 18 protrude slightly above the top of the groove 24 and epoxy filling 26. Hence, when the front lens is in place, there will be a small gap between the front lens and the front ring 19 that allows air to pass.

One important class of users of the present invention is expected to be airline pilots. While extremely unlikely, portions of the outer skin of airliners have been known to detach in flight at high altitude. If such were to happen, pressurization in the cabin could fail suddenly, and the pressure around a pilot could suddenly drop. If a front lens were to detach under such conditions, obvious problems could result. For airline pilots, therefore, the gap between the front lens and the front ring mentioned in the previous paragraph should be adequately sized to permit sufficient airflow to assure that the air pressure on the rear of the front lens will drop rapidly enough under sudden cabin decompression conditions to assure that the front lenses are not dislodged.

Figure 9:
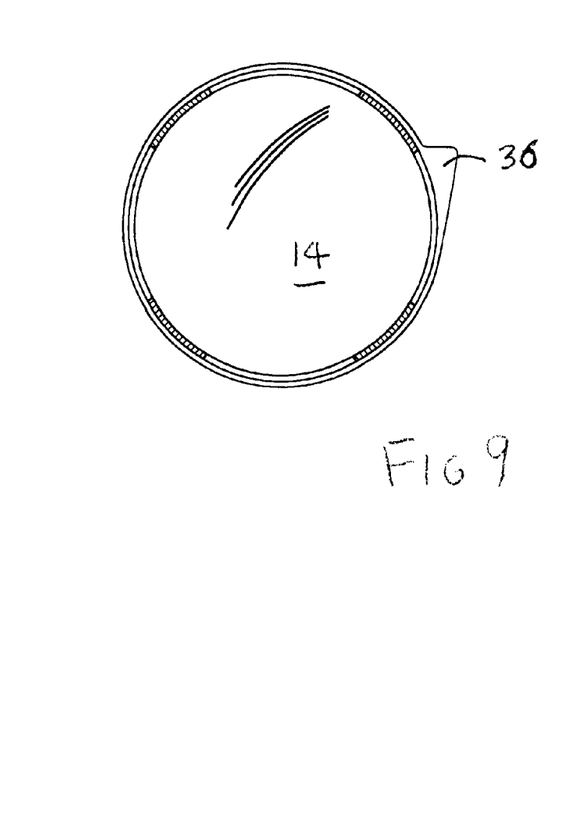
FIG. 9 is a front view of a representative detachable front lens.

FIG. 9 depicts a front view of a front lens 14. A mirror image front lens 14' fits on the opposite lens unit. The shape of each front lens is purposely made obviously non-symmetrical by, for example, including a tab 36, so that a user will not inadvertently attach a right front lens to the left side of the spectacles, and vice versa. Tabs 36 inherently provide an indication to a user of the angular orientations at which the lenses 14 and/or 14' have been installed. The general shape of the front lens away from tab 36 is shown circular in the figure, but it will be recognized that any convenient shape could be used, as dictated by fashion, or other factors. Boss 35, (i.e., the raised portion on the rear face of lens 14, as can be seen in FIGS. 2 to 5), laterally interlocks with inner surface 37 of the central opening in rim 19, and keeps front lens 14 from sliding off its respective lens unit. That is, if one were to try to slide one of the lenses off its respective lens unit, the raised edge of boss 35 will engage with inner surface 37 of ring 19 and prevent such from happening.

We claim:

1. A detachable lens for variable focus spectacles, each pair of said spectacles being comprised of two lens units, wherein each lens unit includes a magnetizable rim that has a front face, including a central opening with a predetermined size and shape in said front face, and each lens unit accepts an associated detachable lens, each of said detachable lenses being unconnected to the other, and each said detachable lens comprising:
    a lens having front and rear faces;
    a plurality of magnets embedded in said rear face; and
    a boss on and a part of said rear face of said lens, said boss having a size and shape enabling it to fit within and laterally interlock with said rim at the perimeter of said central opening.

2. A detachable lens for variable focus spectacles as recited in claim 1 wherein said magnets are embedded in a groove in the rear face of said detachable lens.

3. A detachable lens for variable focus spectacles as recited in claim 2 wherein said magnets are retained in said groove by an adhesive.

4. A detachable lens for variable focus spectacles as recited in claim 1 wherein the two detachable lenses associated with the two lens units of each pair of said spectacles are unconnected parts, and further including a locating tab protruding from the periphery of each said detachable lens.

5. A detachable lens for variable focus spectacles as recited in claim 1 wherein said magnets are rare earth magnets.

6. A detachable lens for variable focus spectacles as recited in claim 5 wherein said magnets are of the type chosen from the group of neodymium iron boron and samarium cobalt magnets.

7. A detachable lens for variable focus spectacles as recited in claim 1 wherein the optical power of said lens units are adjustable between a first predetermined optical power and a second predetermined optical power, and the optical power of said detachable lens is substantially equal to the optical power of the distance prescription of an eye of a specific person minus said first predetermined optical power.

8. A detachable lens for variable focus spectacles as recited in claim 7 wherein said magnets are embedded in a groove in the rear face of said lens.

9. A detachable lens for variable focus spectacles as recited in claim 8 wherein said magnets are retained in said groove by an adhesive.

10. A detachable lens for variable focus spectacles as recited in claim 7 wherein the two detachable lenses associated with the two lens units of each pair of said spectacles are unconnected parts, and further including a locating tab protruding from the periphery of each said detachable lens.

11. A detachable lens for variable focus spectacles as recited in claim 1 wherein said magnets space said detachable lens from said rim so as to provide an air leak.

12. A detachable lens for variable focus spectacles, each pair of said spectacles being comprised of two lens units, wherein each lens unit includes a magnetizable rim that has a front face, including a central opening with a predetermined size and shape in said front face, and each lens unit accepts an associated detachable lens, each of said detachable lenses being unconnected to the other, and each said detachable lens comprising:
    a lens having front and rear faces;
    a plurality of magnets embedded in said rear face;
    a boss on and a part of said rear face of said lens, said boss having a size and shape enabling it to fit within and laterally interlock with said rim at the perimeter of said central opening; and
    angular position indicating means in the form of a tab protruding from the periphery of said lens.

13. A detachable lens for variable focus spectacles, each pair of said spectacles being comprised of two lens units, wherein each lens unit includes a magnetizable rim that has a front face, including a central opening with a predetermined size and shape in said front face, and each lens unit accepts an associated detachable lens, each of said detachable lenses being unconnected to the other, and each said detachable lens comprising:
    a lens having front and rear faces;
    a plurality of magnets embedded in said rear face; and
    a transparent boss on and a part of said rear face of said lens, said boss having a size and shape enabling it to fit within and laterally interlock with said rim at the perimeter of said central opening.

14. A detachable lens for variable focus spectacles as recited in claim 13 wherein said magnets are embedded in a groove in the rear face of said detachable lens.

15. A detachable lens for variable focus spectacles as recited in claim 14 wherein said magnets are retained in said groove by an adhesive.

16. A detachable lens for variable focus spectacles as recited in claim 13 wherein the two detachable lenses associated with the two lens units of each pair of said spectacles are unconnected parts, and further including a locating tab protruding from the periphery of each said detachable lens.

17. A detachable lens for variable focus spectacles as recited in claim 13 wherein the optical power of said lens units are adjustable between a first predetermined optical power and a second predetermined optical power, and the optical power of said detachable lens is substantially equal to the optical power of the distance prescription of an eye of a specific person minus said first predetermined optical power.

18. A detachable lens for variable focus spectacles as recited in claim 17 wherein said magnets are embedded in a groove in the rear face of said lens.

19. A detachable lens for variable focus spectacles as recited in claim 18 wherein said magnets are retained in said groove by an adhesive.

20. A detachable lens for variable focus spectacles as recited in claim 17 wherein the two detachable lenses associated with the two lens units of each pair of said spectacles are unconnected parts, and further including a locating tab protruding from the periphery of each said detachable lens.

* * * * *